Aug. 20, 1968     E. J. PETRY     3,398,216
METHOD OF AND APPARATUS FOR FABRICATING CRYSTALLINE DIELECTRICS
HAVING IMPROVED SHEAR STRENGTH
Filed March 2, 1965

INVENTOR
E. J. PETRY
BY
ATTORNEY

United States Patent Office 3,398,216
Patented Aug. 20, 1968

3,398,216
METHOD OF AND APPARATUS FOR FABRICATING CRYSTALLINE DIELECTRICS HAVING IMPROVED SHEAR STRENGTH
Edward J. Petry, 29 La Clede Ave.,
Trenton, N.J. 08618
Filed Mar. 2, 1965, Ser. No. 436,461
5 Claims. (Cl. 264—24)

ABSTRACT OF THE DISCLOSURE

Disclosed are a system and method for fabricating crystalline dielectrics having improved shear strength. A dielectric in molten form is extruded from a die and passed between a pair of plates excited by a low duty cycle R.F. source. A cooling gas is fed to the dielectric while it is between the plates, whereby the dielectric is in a solid condition as it emerges from the plates.

---

Figure 1:
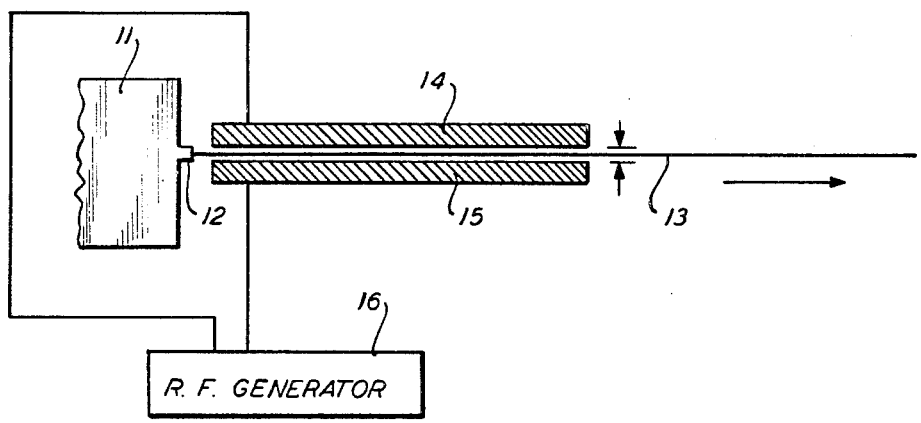

The present invention relates to methods of and apparatus for fabricating crystalline dielectrics having improved shear strength and more particularly to a method and apparatus wherein molecular dislocations are avoided by subjecting the material to a non-heating, molecular aligning radio field.

It is known that the theoretical shear strength of crystalline materials is considerably greater than what has actually been encountered in practice. One of the factors contributing to the stated departure from theoretical strength is slip that results from dislocations between molecules in the crystalline material. A dislocation is a phenomenon whereby the regular, geometrical pattern of molecules in a crystal plane is disturbed by an extra row of molecules. The extra row of molecules originates interiorly of the crystal and is sandwiched between a pair of rows that are parallel and adjacent to each other at the point before the extra row begins. The point at which the extra row begins is the dislocation. The phenomenon is more fully described on pp. 76–79 of "Elements of Materials," by Addison-Wesley Publishing Co., Inc., August 1960.

Dislocations pronouncedly affect the ease with which adjacent crystalline planes slip relative to each other. The presence of dislocations enables molecules in the adjacent planes to be shifted, a few at a time, from their low-energy positions. The shifted molecules slip over adjacent molecules to the next low-energy position. Since all the molecules are not simultaneously slipped, considerably lower stresses applied to the crystalline body results in additional slips; hence, a lowering of the crystalline body shear stress.

In accordance with the present invention, the quantity of molecular slips in dielectric crystalline materials is considerably reduced over what it normally would be since alignment of the molecular rows is achieved in response to the action of a recently discovered phenomenon. The recent discovery is that alignment of molecular rows in a crystal dielectric is attained if an R.F. field is applied to the material. The duty cycle of the R.F. source must be sufficiently low to prevent dielectric heating of the crystalline material. It has been observed that in materials having molecules in mobilized states, such as exists in plastics, at elevated temperatures, the molecules form aligned, elongated chains parallel to the electric field of the R.F. field. Alignment of the crystalline molecules in response to the R.F. field prevents, to a large degree, dislocations between the molecular rows; whereby increases of the shear strength of the material can be obtained. Alignment occurs during both the on and off portions of the duty cycle if the duty cycle repetition rate is 50 times per second or greater.

It is, accordingly, an object of the present invention to provide a new and improved method of and apparatus for strengthening crystalline materials by substantially reducing the number of dislocations.

Another object of the invention is to provide a new and improved method of and apparatus for increasing the shear strength of crystalline materials by causing increased alignment of molecular rows within the crystal.

It is an additional object of the invention to provide a method of and apparatus for reducing the number of dislocations in a crystal dielectric, whereby dielectrics of increased strength are attained by applying a non-heating R.F. field to the material while its molecules are in a mobile condition.

Figure 2:
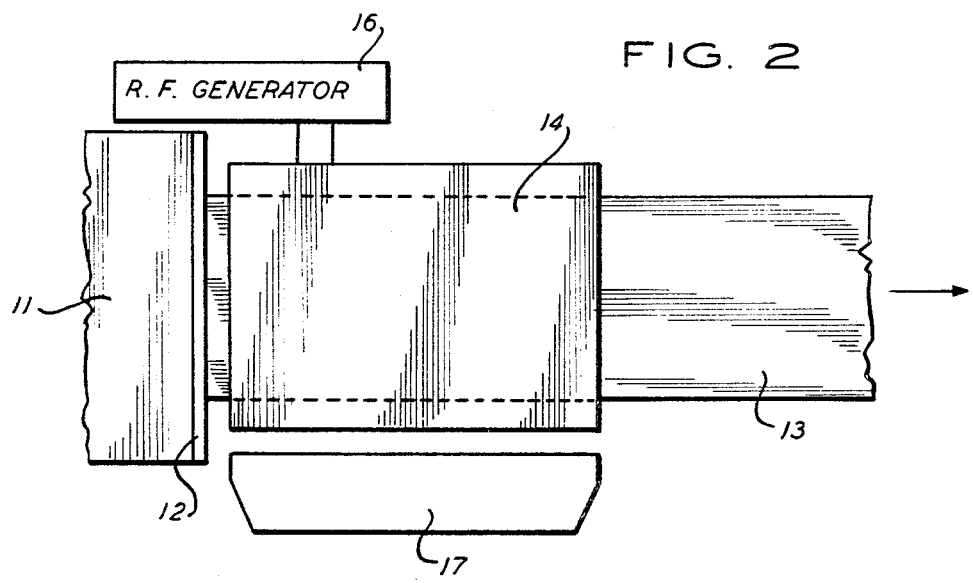

The above and still further objects, features and advantages of the present invention will become apparent upon consideration of the following detailed description of one specific embodiment thereof, especially when taken in conjunction with the accompanying drawings, wherein:

FIGURE 1 is a side view of the apparatus employed for carrying out the method for polyvinyl chloride; and FIGURE 2 is a top view of the apparatus of FIGURE 1.

Reference is now made to FIGURES 1 and 2 of the drawings wherein there is illustrated an extruder 11 of polyvinyl chloride. The polyvinyl chloride emerges from the rectilinear orifice 12 of extruder 11 as a sheet 13 maintained at approximately 350° F. At 350° F., the molecules of polyvinyl sheet 13 have high mobility, i.e., the molecular forces between the molecules are relatively weak and are not difficult to overcome. Immediately upon emerging from orifice 12, sheet 13, while it is at the elevated, 350° F. temperature, passes between rectangular metal plates 14 and 15.

Connected to plates 14 and 15, which are in essence the electrodes of a capacitor, are the output terminals of R.F. generator 16. Generator 16 has a sufficiently low-duty cycle, i.e., ratio of on time to off time, to prevent substantial dielectric heating of sheet 13. The frequency thereof is dependent, to a large degree, upon the material of sheet 13 and is such that the molecules in sheet 13 are aligned parallel to the R.F. electric field directed at right angles between the surfaces of plates 14 and 15. The peak amplitude of the R.F. voltage applied between plates 14 and 15, and across the thickness of sheet 13, must be sufficient to provide an electric field that overcomes the molecular forces between the mobile molecules, at 350° F., so the molecules can be aligned. Of course, the electric field cannot exceed the dielectric strength of sheet 13, but the field strength must approach the sheet breakdown voltage to achieve alignment.

Even after molecular alignment is attained, whereby the number of dislocations is reduced over what it would normally be, polyvinyl sheet 13 is subjected to the R.F. field of generator 16 until the sheet reaches room temperature, 70° F. This result is accomplished by providing plates 14 and 15 with sufficient length. It is necessary to maintain the molecular rows aligned in response to the field of source 16 while the sheet is being cooled to room temperature to insure a reduced number of dislocations. Removal of the R.F. field with the sheet at high temperature and the molecules in a highly mobile state would possibly enable the molecules to readily assume their usual more random pattern, whereby an increase in the number of dislocations occurs. In any event, the molecules of sheet 13 must be immobilized prior to removal of the molecular aligning field produced by source 16.

To promote rapid cooling of sheet 13 while it is between plates 14 and 15 so the plate lengths can be reduced considerably over what they would otherwise be, cooling unit 17 is provided. Cooling unit 17, extending along the length of plates 14 and 15 to one side thereof, forces cold air between plates 14 and 15 so both surfaces of sheet 13 are cooled.

Since alignment of the molecules in sheet 13 in response to the R.F. field between plates 14 and 15 is accomplished only if the field does not heat the sheet, the duty cycle of generator 16 must be adjusted to prevent dielectric heating within the sheet. The rate of energy dissipation in sheet 13, due to dielectric heating, can be calculated as:

$$p = 2\pi f C V^2 \cot\theta \qquad (1)$$

where:

$p$ = rate of energy dissipation (watts)
$f$ = frequency (c.p.s.)
$C$ = capacity of sheet 13
$V$ = peak voltage between plates 14 and 15 (volts)
$\theta$ = phase angle between the current and voltage applied between plates 14 and 15.

The capacity, in farads, between plates 14 and 15 can be calculated as:

$$C = 8.85 \times 10^{-14} \epsilon A/b \qquad (2)$$

where:

$\epsilon$ = dielectric constant of sheet 13
$A$ = mutual area of one of plates 14 and 15 (cm.$^2$)
$b$ = separation between plates 14 and 15.

The heat generated in a unit volume of sheet 13 while it is between plates 14 and 15 can be calculated by combining Equations 1 and 2, and introducing the appropriate conversion factors to derive the expression:

$$G = 13.3 \times 10^{-14} f V^2 / b^2 E \cot\theta \qquad (3)$$

where $G$ = heat generation rate in cal/cm.$^3$-sec. Since $f$, $V$, $\epsilon$, $\theta$ and, to a certain extent $b$, are determined by the properties of sheet 13, Equation 3 and the cooling rate of unit 17 are utilized for determining the duty cycle of source 16. The duty cycle, $a$, of source 16, is adjusted so that $G/a$ is slightly less than the rate at which unit 17, in combination with the atmosphere, cools sheet 13.

The frequency applied by generator 16 to plates 14 and 15 appears to depend upon many variables of the material, such as molecular size and electron spin orbit. Thus, for one type of dielectric material, the frequency of generator 16 should be approximately 5 mc. while for another material it is on the order of 35 mc. I have not been able to derive any precise formula for ascertaining the frequency necessary to achieve molecular alignment. It is possible, however, to determine the correct frequency empirically by placing a sample of the dielectric material, heated to a temperature at which the molecules are sufficiently mobile, under a microscope. With the microscope and a variable frequency R.F. source, the frequency necessary to cause the molecules to be in alignment, rather than in a more random relationship, is readily ascertained. The duty cycle of the source must, of course, be varied as its frequency is changed to preclude the possibility of R.F. dielectric heating. The field must also be applied to sheet 13 a sufficient number of times each second (at least 50) to maintain the molecules aligned during the off portions of the duty cycle.

It is to be understood that the process can be carried out with any suitable crystalline dielectric. Also, it is not necessarily employed in conjunction with an extruding operation nor with the formation of sheets. For example, dielectric I beams can be formed by the present invention if orifice 12, as well as plates 14 and 15 are appropriately shaped.

While I have described and illustrated one specific embodiment of my invention, it will be clear that variations of the details of construction which are specifically illustrated and described may be resorted to without departing from the true spirit and scope of the invention as defined in the appended claims.

I claim:

1. A method of fabricating a crystalline dielectric having improved shear strength comprising subjecting said dielectric to a non-heating R.F. field while its molecules are mobilized, the frequency and strength of said field being such as to align said molecules in chains and overcome the molecular forces between said molecules, and immobilizing said molecules while said field is applied to said dielectric.

2. A method of fabricating a crystalline dielectric having improved shear strength comprising subjecting said dielectric to a non-heating R.F. field while its molecules are mobilized, the frequency and strength of said field being such as to align said molecules in chains parallel to the electric field of said R.F. field and overcome the molecular forces between said molecules, and immobilizing said molecules while said R.F. field is applied to said dielectric.

3. A method of fabricating a crystalline dielectric having improved shear strength comprising the steps of subjecting said dielectric to an R.F. field having a low duty cycle while the dielectric is maintained at a temperature wherein its molecules are mobilized, the frequency and strength of said field being such as to align said molecules in chains parallel to the electric field of the R.F. field and overcome the molecular forces between said molecules, immobilizing said molecules while said R.F. field is being applied to said dielectric by cooling said dielectric, the rate of cooling and duty cyle of said R.F. field being such that said dielectric is not heated in response to the low duty cycle R.F. field.

4. A method of fabricating a crystal dielectric having improved shear properties comprising the steps of extruding the dielectric, applying a non-heating R.F. field to the dielectric immediately after it has been extruded when it is at a temperature wherein its molecules are mobilized, the strength and frequency of said field being such as to align said molecules in chains parallel to the electric field of the R.F. field and overcome the molecular forces between said molecules, and cooling said dielectric while the R.F. field is being applied thereto to immobilize said molecules.

5. Apparatus for fabricating a crystalline dielectric having improved shear strength comprising means for extruding said dielectric as a solid having mobile molecules, a parallel plate capacitor downstream of said extruding means, said capacitor being placed to receive said dielectric between its plates, the edges of said capacitor closest to said extruding means being located such that the molecules of the extruded dielectric are mobile when the dielectric passes between them, a low duty cycle R.F. source connected between said plates, the frequency of said source and the field strength it produces between said plates being such as to align the molecules of said dielectric in chains and overcome the molecular forces between said molecules when said dielectric is passing between said plates at said edges, the duty cycle being such as to prevent heating of said dielectric, means for feeding a cooled gas between the volume of said plates, the lengths of said plates, the rate at which said dielectric is extruded, and the cooling rate of said gas feeding means being such that the dielectric emerges from between said plates substantially at room temperatures.

References Cited

UNITED STATES PATENTS

| | | | |
|---|---|---|---|
| 1,918,848 | 7/1933 | Land et al. | 264—108 |
| 1,997,263 | 4/1935 | Meissner | 264—24 |
| 2,293,851 | 8/1942 | Rogers. | |
| 2,914,109 | 11/1959 | Hsu et al. | |

JAMES A. SEIDLECK, *Primary Examiner.*

J. R. THURLOW, *Assistant Examiner.*